US009680995B2

(12) United States Patent
Tendick et al.

(10) Patent No.: US 9,680,995 B2
(45) Date of Patent: Jun. 13, 2017

(54) REPORTING ON CALL CENTER DATA ACROSS MULTIPLE CONCURRENT ACTIVITY SOURCES

(71) Applicant: Avaya Inc., Basking Ridge, NJ (US)

(72) Inventors: Patrick Tendick, Basking Ridge, NJ (US); Roger I. Krimstock, Boulder, CO (US); Matias Potel Feola, Ciudad de Buenos Aires (AR)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/792,666

(22) Filed: Mar. 11, 2013

(65) Prior Publication Data

US 2014/0254786 A1   Sep. 11, 2014

(51) Int. Cl.
H04M 3/00 (2006.01)
H04M 5/00 (2006.01)
G06F 15/173 (2006.01)
H04M 3/51 (2006.01)
G06Q 10/06 (2012.01)

(52) U.S. Cl.
CPC ...... H04M 3/5175 (2013.01); G06Q 10/0639 (2013.01); H04M 2203/558 (2013.01)

(58) Field of Classification Search
CPC .. H04M 15/41; H04M 3/2218; H04M 3/2227; H04M 3/51; H04M 3/42221; H04M 3/5175

USPC ..... 379/265.03, 88.11, 266.1, 88.22, 265.09, 379/265.05; 709/224
See application file for complete search history.

(56) References Cited

U.S. PATENT DOCUMENTS

| | | | |
|---|---|---|---|
| 6,731,730 B1 * | 5/2004 | Zolotov | 379/126 |
| 6,785,369 B2 * | 8/2004 | Diamond et al. | 379/88.22 |
| 6,785,370 B2 * | 8/2004 | Glowny et al. | 379/88.22 |
| 6,937,706 B2 * | 8/2005 | Bscheider | G11B 31/00 379/111 |
| 8,102,973 B2 * | 1/2012 | Peterson | 379/88.11 |
| 2001/0043685 A1 * | 11/2001 | Bscheider et al. | 379/88.22 |
| 2001/0055372 A1 * | 12/2001 | Glowny | H04M 3/36 379/88.22 |
| 2007/0112953 A1 * | 5/2007 | Barnett | 709/224 |
| 2008/0021762 A1 * | 1/2008 | Coon et al. | 705/10 |
| 2008/0285739 A1 * | 11/2008 | Golitsin | H04M 3/5191 379/265.09 |

* cited by examiner

*Primary Examiner* — Thjuan K Addy
(74) *Attorney, Agent, or Firm* — Sheridan Ross P.C.

(57) ABSTRACT

Aspects are directed towards methods including creating multiple states from at least two call center data sources; and combining at least two of the multiple states to obtain a data model, where the data model comprises an attribute related to the call center, and methods including collecting a set of call data from multiple sources, where the multiple sources comprise a management module source and at least one source not controlled by the management module, and analyzing the set of call data.

20 Claims, 8 Drawing Sheets

| STG_SA_FCTCALLFOCUSSTATE | |
|---|---|
| FCTCALLFOCUSSTATEKEY | NUMBER(38) |
| CALLSEGMENTKEY | INTEGER |
| AGENTID | VARCHAR2(15) |
| ANSWERINGLOCATION | INTEGER |
| DIRECTION | VARCHAR2(10) |
| CALLSTATE | VARCHAR2(60) |
| DISPOSITIONKEY | INTEGER |
| CALLSTATUSINDICATORKEY | INTEGER |
| DISPOSITIONQUEUEKEY | INTEGER |
| DISPOSITIONROUTINGPOINTKEY | INTEGER |
| INTERSTARTUTCTIMESTAMP | TIMESTAMP(6) |
| INTERSTOPUTCTIMESTAMP | TIMESTAMP(6) |
| INTERSTARTACDDATE | TIMESTAMP(6) |
| SEGMENTSTARTACDDATE | TIMESTAMP(6) |
| SEGMENTSTOPACDDATE | TIMESTAMP(6) |
| SOURCEKEY | INTEGER |
| APPNAME | VARCHAR2(255) |
| WINDOWSTITLE | VARCHAR2(255) |
| PROCESSID | VARCHAR2(255) |
| URI | VARCHAR2(255) |
| BUSYCOUNT | INTEGER |
| RINGCOUNT | INTEGER |
| CONSULTCOUNT | INTEGER |
| TALKCOUNT | INTEGER |
| TRANSFERCOUNT | INTEGER |
| CONFERENCECOUNT | INTEGER |
| ONHOLDCOUNT | INTEGER |
| REDIRECTCOUNT | INTEGER |
| ACWCOUNT | INTEGER |
| GOTFOCUSCOUNT | INTEGER |
| STARTINFOCUSCOUNT | INTEGER |
| DURATION | INTEGER |
| UCID | VARCHAR2(20) |
| UCID2 | VARCHAR2(20) |
| ETLCOMPLETE | INTEGER |
| SEGMENTSTARTACDINTERVALKEY | INTEGER |
| SEGMENTSTOPACDINTERVALKEY | INTEGER |
| SEGMENTSTARTACDDATEKEY | INTEGER |
| SEGMENTSTOPACDDATEKEY | INTEGER |

| STG_SA_FCTAGENTFOCUSSTATE | |
|---|---|
| FCTAGENTFOCUSSTATEKEY | NUMBER(38) |
| AGENTID | VARCHAR2(15) |
| CMS | VARCHAR2(255) |
| ACD | VARCHAR2(255) |
| INTERSTARTUTCTIMESTAMP | TIMESTAMP(6) |
| INTERSTOPUTCTIMESTAMP | TIMESTAMP(6) |
| INTERSTARTACDDATE | TIMESTAMP(6) |
| INTERSTOPACDDATE | TIMESTAMP(6) |
| DURATION | INTEGER |
| AUXNUMBER | INTEGER |
| AUXIND | INTEGER |
| ACWIND | INTEGER |
| GOTFOCUSCOUNT | INTEGER |
| STARTINFOCUSCOUNT | INTEGER |
| APPNAME | VARCHAR2(255) |
| WINDOWSTITLE | VARCHAR2(255) |
| PROCESSID | VARCHAR2(255) |
| URI | VARCHAR2(255) |
| STATE | VARCHAR2(60) |
| ETLCOMPLETE | INTEGER |

| STG_SA_CALLSTATE | |
|---|---|
| CALLSTATEKEY | NUMBER(38) |
| WINDOWSID | VARCHAR2(255) |
| CMS | VARCHAR2(255) |
| ACD | VARCHAR2(255) |
| AGENTID | VARCHAR2(15) |
| EVENTTYPE | VARCHAR2(60) |
| UCID | VARCHAR2(20) |
| UCID2 | VARCHAR2(20) |
| DIRECTION | VARCHAR2(10) |
| STARTTIME | TIMESTAMP(6) |
| STOPTIME | TIMESTAMP(6) |
| DURATION | INTEGER |
| TRANSFERED | INTEGER |
| CONFERENCED | INTEGER |
| REDIRECTED | INTEGER |
| CALLFOCUSSTATEFACTCOMPLETED | INTEGER |
| COPIEDTODATAMART | INTEGER |

| STG_SA_APPLICATIONSTATE | |
|---|---|
| APPLICATIONSTATEKEY | NUMBER(38) |
| WORKSTATIONNAME | VARCHAR2(255) |
| WINDOWSID | VARCHAR2(255) |
| APPNAME | VARCHAR2(255) |
| WINDOWSTITLE | VARCHAR2(255) |
| PROCESSID | VARCHAR2(255) |
| URI | VARCHAR2(255) |
| EVENTTYPE | VARCHAR2(255) |
| STARTTIME | TIMESTAMP(6) |
| STOPTIME | TIMESTAMP(6) |
| DURATION | INTEGER |
| CALLFOCUSSTATEETLRUNSCOUNTER | INTEGER |
| CALLFOCUSSTATEFACTCOMPLETED | INTEGER |
| AGENTFOCUSSTATEFACTCOMPLETED | INTEGER |
| COPIEDTODATAMART | INTEGER |

| STG_SA_AGENTSTATE | |
|---|---|
| AGENTSTATEKEY | NUMBER(38) |
| WINDOWSID | VARCHAR2(255) |
| AGENTID | VARCHAR2(15) |
| CMS | VARCHAR2(255) |
| ACD | VARCHAR2(255) |
| EVENTTYPE | VARCHAR2(60) |
| AUXNUMBER | INTEGER |
| STARTTIME | TIMESTAMP(6) |
| STOPTIME | TIMESTAMP(6) |
| DURATION | INTEGER |
| AGENTFOCUSSTATEFACTCOMPLETED | INTEGER |
| COPIEDTODATAMART | INTEGER |

| DM_DIMACCOUNT | |
|---|---|
| ACCOUNTKEY | INTEGER |
| SOURCEKEY | INTEGER |
| AGENTKEY | INTEGER |
| NATIVEID | VARCHAR2(180) |
| ACCOUNTNAME | VARCHAR2(200) |
| DM_BATCHID | INTEGER |
| DM_CREATEDATE | DATE |
| DM_LASTUPDATEDATE | DATE |
| EFFECTIVEDATE | DATE |
| EXPIRATIONDATE | DATE |
| ISCURRENTRECORDING | INTEGER |
| INACTIVEIND | INTEGER |

Fig. 7

| STG_SA_APPLICATIONSESSION | |
|---|---|
| APPLICATIONSESSIONKEY | NUMBER(38) |
| WORKSTATIONNAME | VARCHAR2(255) |
| WINDOWSID | VARCHAR2(255) |
| APPNAME | VARCHAR2(255) |
| PROCESSID | VARCHAR2(255) |
| STARTTIME | TIMESTAMP(6) |
| STOPTIME | TIMESTAMP(6) |
| FOCUSCOUNT | INTEGER |
| FOCUSDUR | INTEGER |
| APPLICATIONDUR | INTEGER |
| ETLCOMPLETE | INTEGER |

| DM_DIMAGENT | |
|---|---|
| AGENTKEY | INTEGER |
| NATIVEID | VARCHAR2(180) |
| AGENTNAME | VARCHAR2(200) |
| DOMAIN | VARCHAR2(200) |
| DM_BATCHID | INTEGER |
| DM_CREATEDATE | DATE |
| DM_LASTUPDATEDATE | DATE |
| EFFECTIVEDATE | DATE |
| EXPIRATIONDATE | DATE |
| ISCURRENTRECORDING | INTEGER |
| INACTIVEIND | INTEGER |

| STG_SA_APPLICATIONEVENT | |
|---|---|
| EVENTKEY | NUMBER(38) |
| WORKSTATIONNAME | VARCHAR2(255) |
| WINDOWSID | VARCHAR2(255) |
| APPNAME | VARCHAR2(255) |
| WINDOWTITLE | VARCHAR2(255) |
| PROCESSID | VARCHAR2(255) |
| URI | VARCHAR2(255) |
| EVENTTYPE | VARCHAR2(255) |
| EVENTTIME | TIMESTAMP(6) |
| RECVDTIME | TIMESTAMP(6) |
| ETLCOMPLETE | INTEGER |

| STG_SA_AGENTSESSION | |
|---|---|
| AGENTSESSIONKEY | NUMBER(38) |
| WINDOWSID | VARCHAR2(255) |
| AGENTID | VARCHAR2(15) |
| STATIONNUMBER | VARCHAR2(255) |
| CMS | VARCHAR2(255) |
| ACD | VARCHAR2(255) |
| STARTTIME | TIMESTAMP(6) |
| STOPTIME | TIMESTAMP(6) |
| LOGOUTNUMBER | INTEGER |
| DURATION | INTEGER |
| ETLCOMPLETE | INTEGER |

| STG_SA_AGENTSESSIONEVENT | |
|---|---|
| EVENTKEY | NUMBER(38) |
| WINDOWSID | VARCHAR2(255) |
| AGENTID | VARCHAR2(15) |
| SWITCHID | VARCHAR2(255) |
| STATIONNUMBER | VARCHAR2(255) |
| LOGOUTNUMBER | INTEGER |
| EVENTTYPE | VARCHAR2(255) |
| EVENTTIME | TIMESTAMP(6) |
| RECVDTIME | TIMESTAMP(6) |
| ETLCOMPLETE | INTEGER |

| STG_SA_CALLEVENT | |
|---|---|
| EVENTKEY | NUMBER(38) |
| WINDOWSID | VARCHAR2(255) |
| AGENTID | VARCHAR2(15) |
| SWITCHID | VARCHAR2(255) |
| EVENTTYPE | VARCHAR2(60) |
| UCID | VARCHAR2(20) |
| UCID2 | VARCHAR2(30) |
| EVENTTIME | TIMESTAMP(6) |
| RECVDTIME | TIMESTAMP(6) |
| ETLCOMPLETE | INTEGER |

| STG_SA_AGENTSTATEEVENT | |
|---|---|
| EVENTKEY | NUMBER(38) |
| WINDOWSID | VARCHAR2(255) |
| AGENTID | VARCHAR2(15) |
| SWITCHID | VARCHAR2(255) |
| EVENTTYPE | VARCHAR2(60) |
| AUXNUMBER | INTEGER |
| EVENTTIME | TIMESTAMP(6) |
| RECVDTIME | TIMESTAMP(6) |
| ETLCOMPLETE | INTEGER |

| STG_SA_WORKSTATIONUSERSESSION | |
|---|---|
| WORKSTATIONUSERSESSIONKEY | NUMBER(38) |
| WORKSTATIONNAME | VARCHAR2(255) |
| WINDOWSID | VARCHAR2(255) |
| EVENTTYPE | VARCHAR2(255) |
| STARTTIME | TIMESTAMP(6) |
| STOPTIME | TIMESTAMP(6) |
| DURATION | INTEGER |
| ETLCOMPLETE | INTEGER |

| STG_SA_WORKSTATIONSESSIONEVENT | |
|---|---|
| EVENTKEY | NUMBER(38) |
| WORKSTATIONNAME | VARCHAR2(255) |
| IPADDRESS | VARCHAR2(15) |
| OSVERSION | VARCHAR2(255) |
| EVENTTYPE | VARCHAR2(255) |
| EVENTTIME | TIMESTAMP(6) |
| RECVDTIME | TIMESTAMP(6) |
| ETLCOMPLETE | INTEGER |

| STG_SA_WORKSTATIONSESSION | |
|---|---|
| WORKSTATIONSESSIONKEY | NUMBER(38) |
| WORKSTATIONNAME | VARCHAR2(255) |
| IPADDRESS | VARCHAR2(15) |
| OSVERSION | VARCHAR2(255) |
| STARTTIME | TIMESTAMP(6) |
| STOPTIME | TIMESTAMP(6) |
| DURATION | INTEGER |
| ETLCOMPLETE | INTEGER |

| STG_SA_WKSTUSERSESSIONEVENT | |
|---|---|
| EVENTKEY | NUMBER(38) |
| WORKSTATIONNAME | VARCHAR2(255) |
| WINDOWSID | VARCHAR2(15) |
| EVENTTYPE | VARCHAR2(255) |
| EVENTTIME | TIMESTAMP(6) |
| RECVDTIME | TIMESTAMP(6) |
| ETLCOMPLETE | INTEGER |

Fig. 8

REPORTING ON CALL CENTER DATA ACROSS MULTIPLE CONCURRENT ACTIVITY SOURCES

FIELD

An illustrative embodiment is directed toward enhancing call center operations by improving call center reporting across multiple activity sources.

BACKGROUND

Call centers (also known as contact centers) may include automatic call distribution (ACD) systems and are used by many enterprises to serve customer contacts. Call centers typically employ agents who attend to incoming queries from customers. In order to timely service a customer or contact, it is critical that the contact be handled appropriately. Given that most of these organizations are service-centric, it is important that they properly attend to their customers.

SUMMARY

Call centers may have one or more agents in various locations, and one or more management modules in each of those locations to distribute incoming calls to agents and manage outgoing calls. Prior to routing the call to an agent, the call may be routed to various applications. In fact, many call centers are moving from a management module first configuration (e.g., where a telecommunications exchange initially handles all incoming calls prior to other systems) to configurations that use other systems in conjunction with the management module (such as transferring the call away from the management module (e.g., to a Call Center (CC) Mobile Application), or placing the management module behind a front end that handles the calls prior to transferring them to the management module. However, this may result in non-agent-based pre-routing issues. For example, the call may be routed to an Interactive Voice Response (IVR) system, Intelligent Call Routing (ICR), SBC (Session Border Controller), SM (Session Manager), and/or other applications, such as mobile applications. The addition of systems and applications that are not inside of the management module are problematic for cradle-to-grave reporting (e.g., from the start of a communication until the communication is resolved and/or ended) because the management module cannot track all segments of a call. For example, External Call History (ECH) tracks data for segments of the call during which the caller is interacting with an agent, for example by collecting call detail records (CDR). However, the data from IVR and ICR systems are not tracked by ECH and thus, data for the call during IVR and ICR segments cannot be collected and analyzed utilizing ECH. In addition, a call may interflow to another management module (e.g., a call may be moved to another call center that can provide additional or improved service). For example, in a management module first configuration (e.g., Communication Manager (CM) with ACD software), the Call Management System (CMS) ECH tracks all segments of a call; however, when segments of a call are not handled by the management module, the ECH cannot track those segments. Further, when a call is transferred between management modules, the ECH data is separate for each management module. Thus, analytics tools that track call data using ECH cannot accurately obtain data for the entirety of the call.

It is also problematic to obtain an overall view of all activities occurring during a call when the call is handled by call center agents because of issues associated with agent-based integration of application activities. In particular, call center agents typically perform multiple activities concurrently. For example, they often take calls from customers while working with desktop applications to perform their job functions. In addition, they may place themselves in a call center agent state (e.g., auxiliary or after-call-work) to continue working with certain customer requests after a call has been disconnected. Thus, the systems used in the call center can assign states to each agent (e.g., an auxiliary state, when the agent is available, or an after call work state, when the agent has processed the request of the last customer and no longer receives calls), and agents may be able to transition themselves between states. Call center agents are typically tracked for accountability, where data from the management modules may be received to analyze the activities of the agent. However, not all data is obtained in the same format because each data source (e.g., management module, computer-telephony-integration (CTI), User Activity Monitor (UAM)), has its own reporting system and/or method of handling data.

There is therefore a need to provide improved methods and systems for call center data analysis and call tracking. Accordingly, illustrative embodiments are directed towards methods including creating multiple states from at least two call center data sources; and combining at least two of the multiple states to obtain a data model, where the data model comprises an attribute related to the call center, and methods including collecting a set of call data from multiple sources, where the multiple sources comprise one or more management module source and at least one source not controlled by the management module, and analyzing the set of call data.

Additional aspects are directed towards systems including a call center module including at least two call center data sources, where a set of multiple states are created from the at least two call center data sources, and where at least two of the multiple states are combined to obtain a data model, where the data model comprises an attribute related to the call center, and systems including a management module source; and at least one source not controlled by the management module, where a set of call data is collected from both of the management module source and the at least one source not controlled by the management module, and the set of call data is analyzed. In embodiments, the at least one source not controlled by the management module may be a front-end source.

These and other advantages will be apparent from the disclosure contained herein. The above-described embodiments and configurations are neither complete nor exhaustive. As will be appreciated, other embodiments are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, a "customer" may be a purchaser or user of goods or services and may include stakeholders or employees, for example. A customer also includes a contact, which may be an individual or organization, or any entity associated therewith, for example. In addition, a customer may be any entity that interacts with a call center, including making calls to a call center and receiving calls from a call center, for example.

BRIEF DESCRIPTION OF THE DRAWINGS

The illustrative embodiments will be described in detail, with reference to the following figures, wherein:

FIG. 7 illustrates illustrative data in accordance with the disclosure; and

FIG. 8 illustrates illustrative data in accordance with the disclosure.

DETAILED DESCRIPTION

Illustrative embodiments of this invention will be described in relation to communication routing. However, it should be appreciated, that in general, the systems and methods of this invention will work well for any type of communication routing in any environment.

Some embodiments will be illustrated below in conjunction with an illustrative communication system. Although well suited for use with, e.g., a system using switch(es), server(s) and/or database(s), communications endpoints, etc., the embodiments are not limited to use with any particular type of communication system or configuration of system elements. Those skilled in the art will recognize that the disclosed techniques may be used in any communication application in which it is desirable to provide enhanced communications.

Figure 1:
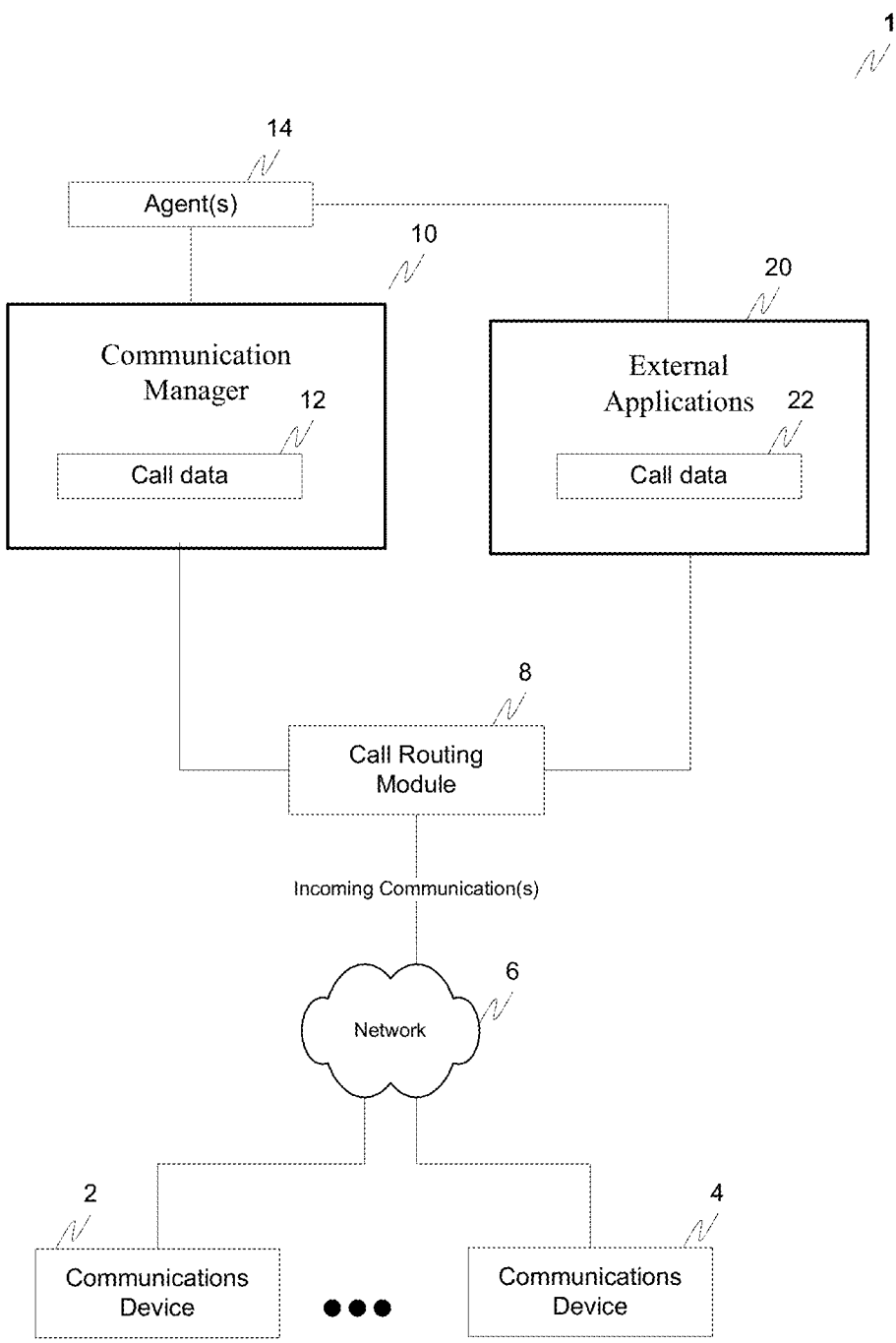
FIG. 1 illustrates an illustrative communications environment.

Referring initially to FIG. 1 an illustrative communication environment 1 will be described in accordance with at least some embodiments. The communication environment comprises (in addition to well-known componentry) a communication network 6 connecting a plurality of communication devices 2-4 capable of sending one or more communications in one or more modalities, and in connection with a call routing module 8. The call routing module 8 is in communication with external applications 20, which includes call data 22 and a management module 10, which includes call data 12 and is in communication with agent(s) 14. Call data 22 and call data 12 may be expressed in different data models.

In embodiments, the communication environment 1 may include a switch such as a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call participants, servers and databases. The switching fabric can provide the functionality to direct incoming and/or outgoing calls to various endpoints and further provides for conferencing capabilities between endpoints as well as the ability for forward information associated with presence.

Communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones. Additional devices associated with the participants may be computer-based internet browsers and/or applications specific to a particular communications modality, such as an application (and associated communications hardware) that supports micro-blogging from a computer or mobile computing or communications device.

The embodiments will also be discussed in conjunction with an illustrative communication network. Although well suited for use with, e.g., a system having a private branch exchange (PBX) or other similar contact processing switch, the embodiments are not limited to use with any particular type of communication system switch or configuration of system elements. Those skilled in the art will recognize that the disclosed techniques may be used in any communication application in which it is desirable to provide improved communication ranking. The term "contact" or "call" as used herein is intended to include any live voice communications, whether circuit switched or packet switched.

One or more switches may also be included in the communications environment and may include a PBX, an enterprise switch, or other type of telecommunications system switch, as well as other types of processor-based communication control devices such as servers, computers, adjuncts, etc. By way of example, the switch may be implemented as an otherwise conventional DEFINITY™ or MULTIVANTAGE™ Enterprise Communication Service (ECS) or Avaya® Aura Communications manager™ communication system switch available from Avaya Inc. Other types of known switches are well known in the art and therefore not described in detail herein.

The communication devices 2-4 may be a wired desktop telephone terminals or any other type of terminals capable of communicating with the external application(s) 20 and/or the agent(s) 14. The word "terminal" and "communications device" as used herein should therefore be understood to include not only wired or wireless desktop telephone terminals but also other types of communication devices, including without limitation IP softphones, IP hardphones, mobile telephones, personal computers, laptops, personal digital assistants (PDAs), smart phones, etc.

The switch could also be coupled via one or more links to the network 6. In configurations, the communication lines or links are trunk lines and the network is the public switched telephone network (PSTN). In other configurations, the communication lines pass through an optional gateway to a packet-switched network, such as the Internet. In any event, the lines or links 5 carry incoming contacts to and from the network 10. It should be noted that the embodiments disclosed herein do not require any particular type of information transport and the embodiments may be implemented with any desired type of transport medium as well as combinations of different types of transport media.

Management module 10 is capable of receiving one or more communications, such as communication from communications devices 2-4, which can be, for an example, an e-mail, SMS message, text message, multimedia presentation, instant message(s) (IM), social media message(s) such as tweets, SIP messages, or the like. In general, the communications environment 1 allows one or more of the communications devices 2-4 to initiate a communication that is routed by the call routing module 8 to connect to external applications 20 or agents 14. In some embodiments, the communications may be initiated using a protocol such as SIP, H.323, HTTP, etc.

In operation, one or more communications are received from one or more of the communications devices 2-4. The call routing module 8, as discussed, one or more of receives, intercepts, monitors, and forwards communications from the communications devices 2-4. For example, the call routing module 8 can be associated with one or more contact centers having agents 14 to assist with routing incoming communications to a destination within the call center. These communications can include one or more of a call, multi-party conference call, e-mail, SMS message, text message, multimedia message, or in general any communications in any communications modality that can be received, monitored, intercepted or forwarded by the call routing module 8. As discussed, the communications device 2-4 can be one or more of a telephone, computer, mobile communication device, smart phone, or in general any communication device that is capable of sending or receiving one or more communications from user(s) (not shown).

Agent(s) 14 often handle calls by interacting with the customer on the other end of the call. Agent(s) 14 use various applications to handle the call, and these applications result in multiple concurrent activity sources. For example, agent(s) 14 can handle calls in conjunction with external applications 20, such as transferring a call to an external application 20, or using an external application 20 in conjunction with the handling of the call.

Each of the activity sources has certain data associated with the application/source. For example, management module, CTI and UAM may each have its own reporting system for its data, if such a reporting system exists at all. Methods and systems disclosed herein advantageously provide for merging such separately sourced data into a coherent data model and software; e.g., integrating agent-based desktop activities with other agent call and non-call activities. Analysis of the data model may advantageously provide useful and/or improved call center performance.

In embodiments, agent(s) 14 can have events associated with their job functions, where the events track agent activities. Events may also be referred to as states, where a state is a snapshot of what the agent is doing at any moment in time. For example, agent(s) 14 may be in states and/or events that include auxiliary (e.g., not handling a call), after-call-work, talk mode, disconnect, and transfer. Further, call, workstation, and application data may also be expressed as events. As described below, the methods and systems herein represent agent activities across multiple activity sources as events, where an agent may have multiple event streams associated with various parts of the agents' activities. This event data may then be represented as states (which may be distinct from the states that are agent events), and a data model may be built upon these states. For example, agent events can be point in time occurrences, and states can have a start and stop time, so that two events may mark the occurrence of a state because one event occurs when a state starts and another event occurs when the state ends. Said another way, a first state may be delimited with two events, with a second state starting with the event that ended the first state. Agent events may include, but are not limited to, AVAILABLE, ACTIVE, AUXILIARY, and WRAP_UP. Call events may include, but are not limited to, RINGING/ALERTING, ANSWERED, DIVERTED, ORIGINATED, CLEARED, HELD, RESUME, BUSY, TRANSFER, and CONFERENCE. Workstation events may include, but are not limited to, LOGIN, LOGOUT, LOCK, UNLOCK. Application events (including information on application fields) may include, but are not limited to, LAUNCH_APPLICATION, CLOSE_APPLICATION, GAIN_FOCUS, and LOSE_FOCUS. Agent states may include, but are not limited to, auxiliary, available, alerting, active, and in call waiting. Agent events and states may be related to work sessions, communications, application use, and workstation use, among others.

The management module 10 manages various aspects of a call. For example, the management module gathers call data 12, such as call records and call-center statistics for use in managing the call center and in generating call-center reports (e.g., start time, stop time, hold time, agent(s) 14 associated with the call, agent(s) 14 skills involved in handling the call, the transaction type (which may include catalog sale, information request, complaint, etc.) and the time-of-day).

External applications 20 may include, for example, applications not incorporated with the management module 10. Illustrative external applications 20 that can interact with a call center agent may include CTI and desktop application event monitors (e.g., UAM). In addition, external applications 20 may be applications that are on the front end to the communication manager 10 (e.g., prior to reaching a management module), and may interact with a call prior to any agent interaction. In embodiments, such external applications 20 may include IVR, ICR, SBC, SM and/or mobile applications. The external applications 20 may perform similar or dissimilar functions as the management module 10. External applications 20 can gather call data 22, such as event records and statistics, and may also track identifying information (e.g., a universal call identifier (UCID)). External applications 20 can be incorporated into agent tools (e.g., an internet browser and website on their computer, or they may be distinct from agent tools (e.g., a survey provided and managed by a company distinct from the call center).

Figure 2:
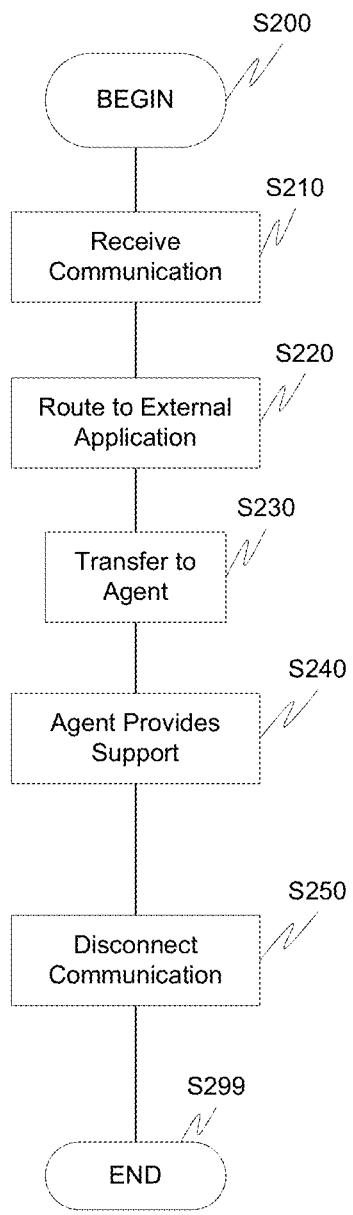
FIG. 2 illustrates an illustrative flowchart in accordance with the disclosure.

FIG. 2 is an illustrative flowchart in accordance with the disclosure. In particular, control begins in step S200 and continues to step S210. In step S210, one or more communications are received by a call routing module in a communications environment. In step S220, the communication is routed, for example by a call routing module, to an external application. In embodiments, the call may be routed to an external application prior to reaching a management module, and the external application may not be in communication with the management module and may not provide data to a call management system (CMS) external call history (ECH). For example, the external application may be an IVR system providing the caller with details of the caller's account prior to any interaction with the management module. In addition, there may be multiple external applications handling the call, such as an IVR IVR implementation or an IVR ICR implementation. Said another way, an IVR may transfer the call to another IVR, or through an ICR to an agent.

In embodiments, the IVR and ICR may not provide data to a call management system (CMS) external call history (ECH); however, the present disclosure advantageously enables identification of external applications and then collection of data from the external applications (e.g., IVR and ICR systems) to be incorporated into ECH, as explained below.

In step S230, the call is transferred to an agent or a communication device being operated by an agent. For example, the external application may transfer the call directly to an agent, or the external application may send the call back to the call routing module, which may then transfer the call to the agent.

In step S240, the agent handles the call (e.g., provides support to the customer). At this point in time, because the agent is connected to the management module, and the agent is handling the call, the management module can track the call and certain events related to the agent and the call while the agent is handling the call.

However, the management module is not aware of the caller's previous interactions with the external application, and any data associated with that interaction. Thus, call segment data from the external applications may not be reported, as discussed below. Further, the management module is also not aware of the agent's interaction with any external applications during the call (e.g., if the agent fills in complaint data on a form on a website, the management module may be aware that the agent is addressing a complaint, but does not know the application being used or the data being entered).

In step S250, the agent is finished handling the call and disconnects the communication to end the process in step S299.

Figure 3:
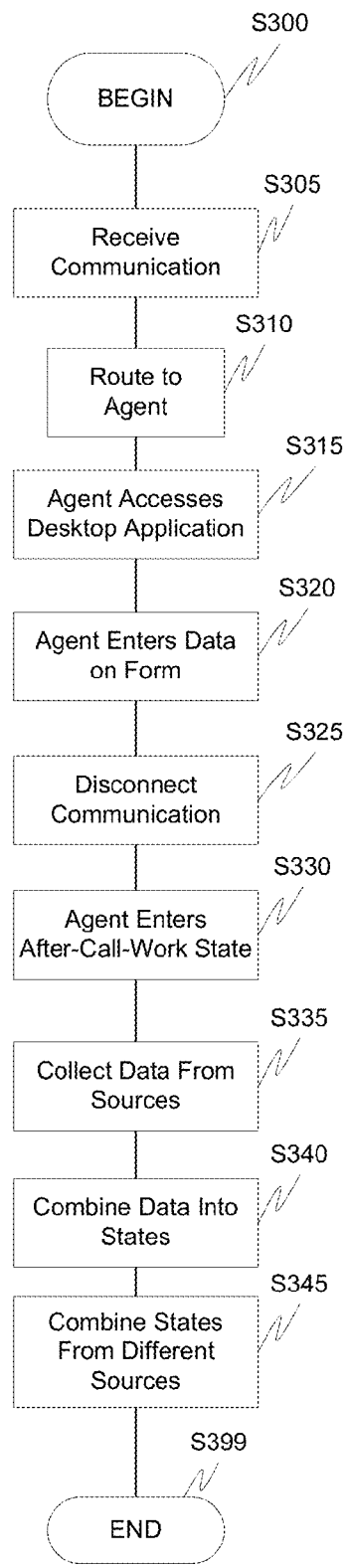
FIG. 3 illustrates an illustrative flowchart in accordance with the disclosure.

FIG. 3 is an illustrative flowchart in accordance with the disclosure. In particular, control begins in step S300 and continues to step S305. In step S305, one or more communications are received.

In step S310, the communication is routed, for example by a call routing module, to an agent. Alternatively, an external application may transfer the call directly to an agent, or the external application may send a call back to the call routing module, which may then transfer the call to the agent. A management module begins tracking the call and collecting data when the call is transferred from the router. Said another way, because the agent is connected through the management module, and the agent is handling the call, the management module can track the call and certain events related to the agent and the call while the agent is handling the call. For example, the management module may track events related to the agent and call, such as transfer, hold, disconnect, and start and stop times. In addition, the management module is connected to a CMS, which processes the management module events into ECH call segment records. For example, the management module may track a call identifier (e.g., UCID), and the call data may be represented in call management system (CMS) external call history (ECH) (e.g., for call segments) and CTI (e.g., for call events). The agent's states and/or events may be provided by CTI as well.

In step S315, the agent accesses a desktop application to provide support to the caller; for example, to look up contact information for a manager of the business to provide to the caller. In embodiments, the management module is unable to track what actions the agent is performing on the desktop. Thus, the management module is only aware that the agent is handling the call and actively interfacing with the caller. The management module is not aware that the agent has accessed a desktop application, or what actions the agent takes to interact with the desktop application to obtain information for the caller. However, the agent's activity data with respect to the desktop application may be tracked and collected by the UAM, which may provide desktop application events.

In step S320, the agent accesses a website to obtain information regarding the customer's queries. Again, the management module is unable to track what actions the agent is performing on the computer. Thus, the management module is only aware that the agent is handling the call and actively interfacing with the caller. The management module is not aware that the agent has accessed a website containing a customer complaint form, or what actions the agent takes to complete the customer complaint form for the caller. However, when the agent switches windows or applications on the desktop, the window focus (e.g., which application is active on the desktop) changes. Such focus data, as well as other event data associated with the agent's access of the website, is tracked and collected by the UAM.

In step S325, the agent is finished talking to the caller and disconnects the communication. However, the agent is not finished handling the call, so in step S330, the agent enters an after-call-work state. For example, the agent finishes entering notes in the agent log regarding the call and then drafts an email regarding the customer queries and asks the supervisor to review the email prior to sending. Again, the agent's after call activities may be tracked and collected by the UAM.

In step S335, data is collected from the sources of call center data. This may be done by an application that is software and/or hardware. For example, data may be collected from the management module, the CMS ECH, the CTI, and the UAM. In step S340, the events are combined into states. In this step, the states may correspond one-to-one with the events, such that the states are not combined.

In step S345, the states from different sources are combined. In embodiments, the states may be combined using an intersection technique to populate data tables. For example, the intersection technique may populate data mart tables in a data warehouse. Call center agent desktop application (e.g., focus) states may be intersected in turn with call states and agent states to result in two staging tables: one for applications intersected with call states (e.g., callfocusfact) and the other for applications intersected with agent states (e.g., agentfocusfact). The methods and systems described herein are not limited to desktop application focus events, and may be used with other events related to a communications environment. For example, all related windows of an application and values associated with fields in those windows may be used in the methods and systems described herein.

In step S350, the data tables may be analyzed to determine properties associated with the call center. For example, the data tables may show what an agent is doing during specific segments of a call and what the agent is doing while in various states, including an auxiliary state. The process ends in step S399.

Figure 4:
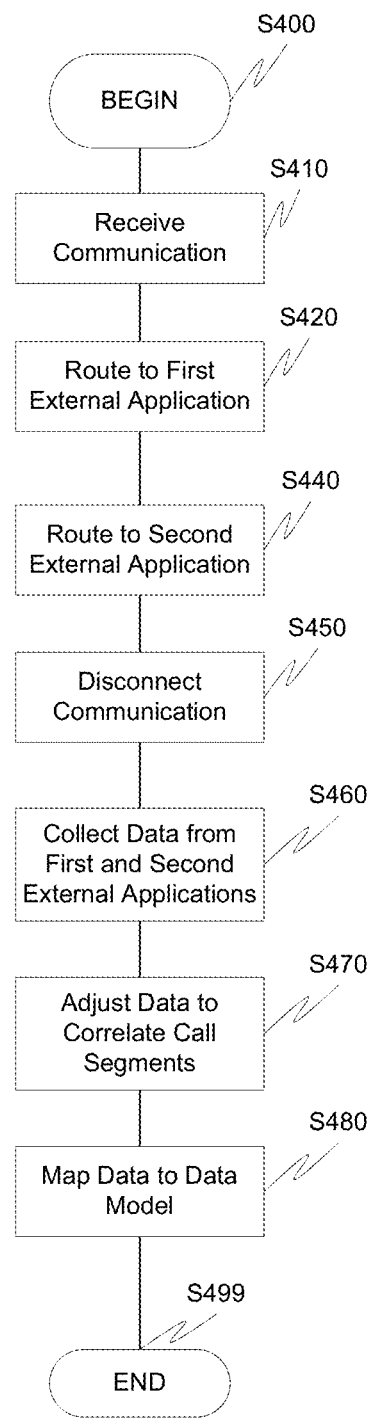
FIG. 4 illustrates an illustrative flowchart in accordance with the disclosure.

FIG. 4 is an illustrative flowchart in accordance with the disclosure. In particular, control begins in step S400 and continues to step S410. In step S410, one or more communications are received. In step S420, the communication is routed, for example by a call routing module, to a first external application. In embodiments, the call may be routed to the external application prior to reaching a management module, and the external application may not be in communication with the management module. For example, the external application may be an interactive voice response (IVR) system providing the caller with details of the caller's account prior to any interaction with the management module. Alternatively, the external application may be voice portal (VP) or intelligent call routing (ICR), among others. Thus, the management module cannot collect data related to the customer's interaction with the first external application and the data related to the first external application is not contained in the CMS ECH. In other words, the CMS ECH is missing the segments of the call related to the first external application. However, the first external application can be a component that may provide data regarding the call.

In step S440, the agent transfers the call to a second external application that, like the first external application, is not in communication with the management module and cannot be tracked by the CMS ECH. The second application may be, for example, an IVR system. Thus, the management module cannot collect data related to the customer's interaction with the second external application. However, similar to the first external application, the second external application can be a component that may provide data regarding the call.

In step S450, the call is finished and is disconnected. In step S460, data is collected from the first and second external applications. Advantageously, methods and systems disclosed herein may advantageously allow tracking of various segments of a call, even when a portion of a call occurs outside the management module. Thus, methods and systems disclosed herein may allow variations in configurations of call centers where all call segments are included in a single data model. Further, several tools rely on CMS ECH data to provide call data, and the methods and systems disclosed herein advantageously provide data about any call segments missing from CMS ECH for use in a comprehensive data model.

In step S470, the data is adjusted to correlate the call segments. In embodiments, correlating the call segments tracks the call through various applications, including management module and applications external to management module. For example, the applications may produce call detail records (CDR), where the CDR may be mapped one-to-one with the ECH data (e.g., via UCIDs); however, some applications may produce CDR that do not map one-to-one with the ECH data. Embodiments disclosed herein may allow various types of data to be mapped to the ECH data by manufacturing ECH call segments from CDR records.

In step S480, the data is mapped to the ECH data model. For example, CDR records may be identified from a session analyzing system (SAS) database, which may be created by SBC, SM, and/or other components outside of the management module. Because CDR and ECH data models are different, especially with respect to grain, the ETL includes identification of groups of CDRs that map to a single ECH call segment record (e.g., an ECH call segment record regarding IVR may be represented by more than one CDR (initial IVR, then subsequent ICR, for example), and methods and systems herein identify all possible CDR groups). The SAS CDR records may be processed periodically, manufacturing equivalent ECH records, which may then be sent to a reporting tool to process the data into respective data models. In step S499 the process ends.

Figure 5:
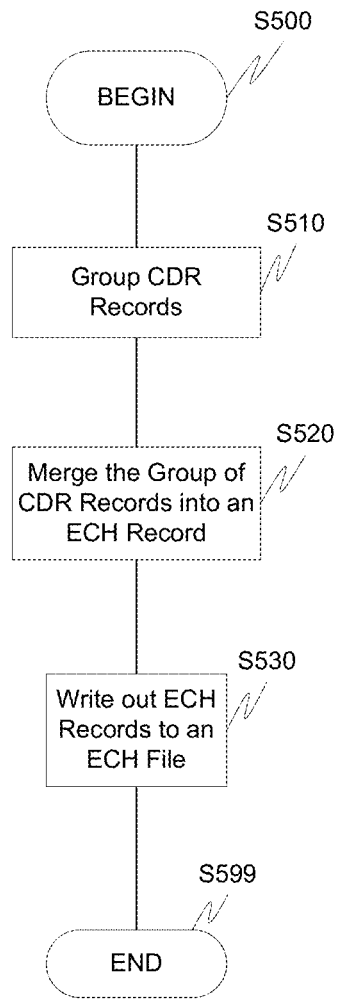
FIG. 5 illustrates an illustrative flowchart in accordance with the disclosure.

FIG. 5 is an illustrative flowchart in accordance with the disclosure. In particular, control begins in step S500 and continues to step S510. In step S510, CDR records that are provided regarding a communication are grouped into individual activities that are outside of the management module (e.g., a single IVR session). In embodiments, call data may be tracked using a UCID. CDR records may be collected from SBC, outgoing calls, website and/or mobile applications interacting with the call, and/or third party IVR. In step S520, the group of CDR records is merged into an ECH record. For example, the CDR records may be adjusted to obtain manufactured ECH data (e.g., data that is compatible with an ECH file). In step S530, the completed ECH records are written out to an ECH file. In step S599, the method ends.

Figure 6:
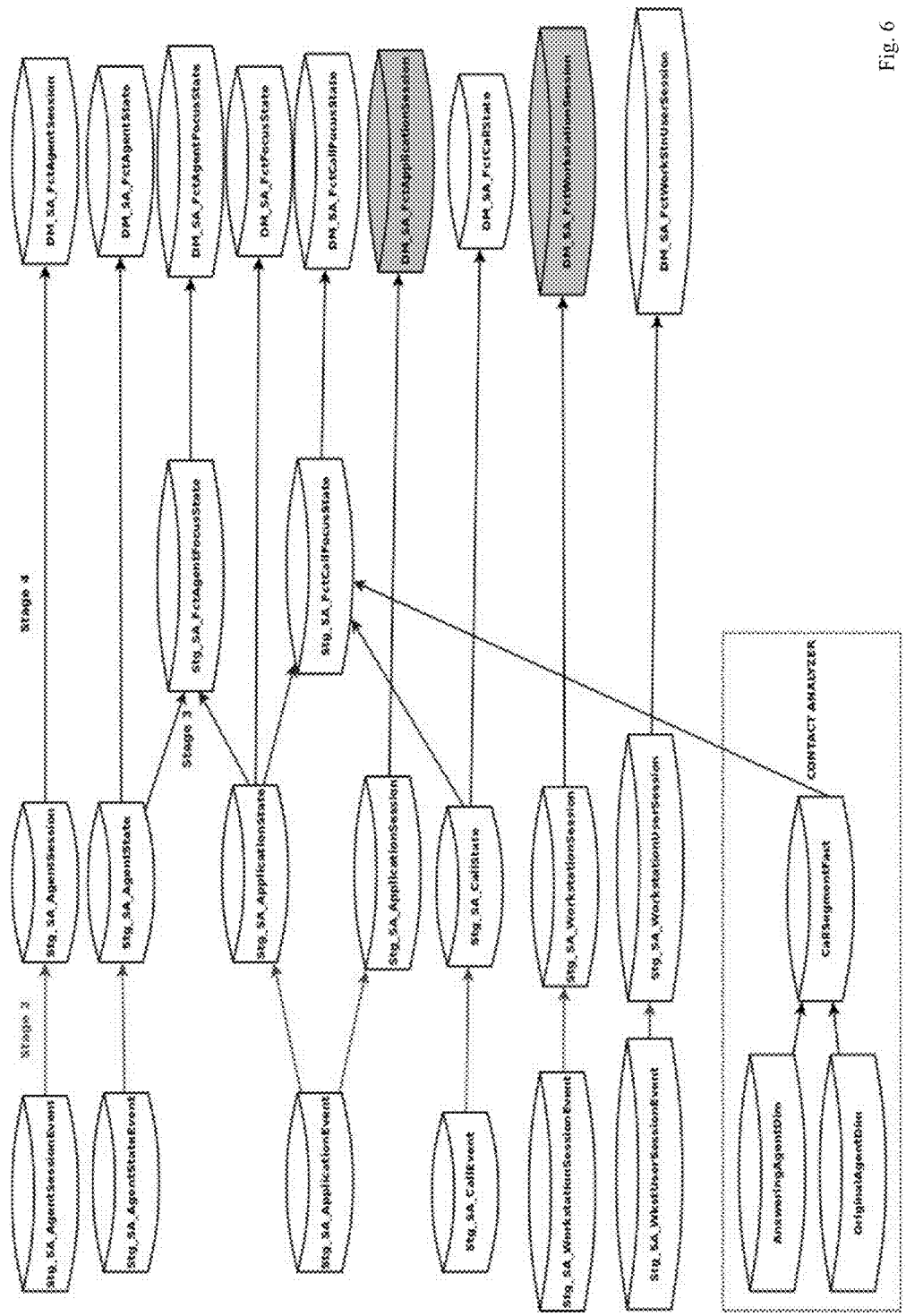
FIG. 6 illustrates an illustrative system in accordance with the disclosure.

FIG. 6 is an illustrative system in accordance with the disclosure. In embodiments, FIG. 6 shows an agent-based integration of call and agent states with desktop activities using an intersection technique. In FIG. 6, an illustrative data flow from a source repository to a final data mart is shown; for example, data flow of the ETL used to produce the intersection data model. Thus, in FIG. 6, intermediate stages help to explain this illustrative embodiment. In stages 1 and 2, event data is collected from different sources and combined into states, where the states are mapped one-to-one to the events, for example. Thus, Stg_SA_AgentSessionEvent is combined as Stg_SA_AgentSession; Stg_SA_AgentStateEvent is combined as Stg_SA_AgentState; Stg_SA_ApplicationEvent is combined as two states; Stg_SA_ApplicationState and Stg_SA_ApplicationSession; Stg_SA_CallEvent is combined as Stg_SA_CallState; Stg_SA_WorkstationSessionEvent is combined as Stg_SA_WorkstationSession; and Stg_SA_WkstUserSessionEvent is combined as Stg_SA_WorkstationUserSession. In embodiments, the source of the events is CTI and UAM.

In Stage 3, selected states are combined using an intersection technique to intersect desktop application (e.g., focus) states with call states and agent states, for example. Stg_SA_AgentState is intersected with Stg_SA_ApplicationState to obtain Stg_SA_FctAgentFocusState. Also, Stg_SA_CallState is merged with CallSegmentFact and Stg_SA_ApplicationState to produce Stg_SA_FctCallFocusState. Stage 3 results in two staging tables for stage 4 (e.g., one for callfocusfact and one for agentfocusfact), and the resulting data mart tables include DM_SA_FctAgentSession, DM_SA_FctAgentState, DM_SA_FctAgentFocusState, DM_SA_FctFocusState, DM_SA_FctCallFocusState, DM_SA_FctApplicationSession, DM_SA_FctCallState, DM_SA_FctWorkstationSession, and DM_SA_FctWorkStnUserSession.

FIGS. 7 and 8 illustrate illustrative data in accordance with the system illustrated in FIG. 6. In particular, FIGS. 7 and 8 show the attributes of the data within the tables in FIG. 6.

The various embodiments include components, methods, processes, systems and/or apparatus substantially as depicted and described herein, including various embodiments, subcombinations, and subsets thereof. Those of skill in the art will understand how to make and use the disclosed techniques after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the embodiments to the form or forms disclosed herein. In the foregoing Detailed Description for example, various features are grouped together in one or more embodiments for the purpose of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the embodiments has included description of one or more features and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the system(s). Additionally, the exact sequence of events need not occur as set forth in the illustrative embodiments. The illustrative techniques illustrated herein are not limited to the specifically illustrated embodiments but can also be utilized with the other illustrative embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with illustrative embodiments, systems, apparatuses and methods for enhancing communication efficiency. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:

1. A method for managing data in a contact center, comprising:
   creating, by a microprocessor, states from at least two different call center data sources, the at least two different call center data sources comprising data for the states, with the states comprising data of different format types, wherein the states are snapshots of an activity of a call center agent; and
   combining, by the microprocessor, at least two of the states with the different format types to obtain a single data model that expresses, in the combined different format types, at least one attribute related to the call center, wherein the single data model is related to multiple customer interactions.

2. The method of claim 1, wherein the at least two of the different call center data sources comprise call segment data and call event data, and at least one of the call center data sources comprises data in a format other than a Call Details Records format.

3. The method of claim 1, wherein the at least two of the different call center data sources comprise at least two of management module, CTI, and UAM.

4. The method of claim 1, wherein the states comprise call segments, wherein the states are adjusted by the microprocessor to correlate the call segments, and wherein at least two of the states are combined using an intersection technique to obtain the single data model.

5. The method of claim 1, wherein the states comprise call segments, and wherein the states are adjusted by the microprocessor to correlate the call segments prior to obtaining the single data model.

6. A method for collecting and managing data in a contact center, comprising:
   collecting a set of call data from multiple sources with at least two data members of the collected call data set comprising states with different format types, wherein the states are snapshots of an activity of a call center agent, wherein the multiple sources comprise a management module source and at least one source controlled independently of the management module source, and wherein the collected call data set is related to multiple customer interactions; and
   combining the at least two data members comprising the states with different format types.

7. The method of claim 6, wherein the at least one source controlled independently of the management module source comprises at least one an IVR and ICR.

8. The method of claim 6, wherein a first source is controlled independently of the management module source and the first source receives a call from a PSTN prior to the management module source.

9. The method of claim 8, wherein a second source is controlled independently of the management module source, and wherein the collected call data set comprises data from the management module source, the first source, and the second source.

10. The method of claim 8, wherein the set of call data from multiple sources does not comprise ECH.

11. A contact center, comprising:
a microprocessor; and
a computer readable medium, coupled to the microprocessor, the computer readable medium comprising at least two call center data sources that comprise data with different format types, wherein the microprocessor creates different states from the at least two call center data sources, wherein each of the different states is a snapshot of an activity of a call center agent, wherein the different states comprise the data having different format types, wherein at least two of the different states are combined by the microprocessor to obtain a data model, wherein the data model comprises an attribute related to the call center, and wherein the data model is related to multiple customer interactions.

12. The contact center of claim 11, wherein the at least two different call center data sources comprise call segment data and call event data, and at least one of the call center data sources comprises data in a format other than a Call Details Records format.

13. The contact center of claim 11, wherein at least a portion of the different states are derived from call center events that track activities of the call center agent.

14. The contact center of claim 11, wherein the different states comprise a call center agent desktop application state, a call state, and an agent state, and wherein the different states are combined by the microprocessor using an intersection technique to obtain the data model.

15. The contact center of claim 11, wherein the different states comprise call segments, and wherein the different states are adjusted by the microprocessor to correlate the call segments.

16. A contact center, comprising:
a server comprising a microprocessor;
a management module source; and
at least one source controlled independently of the management module, wherein the microprocessor collects a set of call data from each of the management module sources and the at least one source controlled independently of the management module sources, wherein the set of call data comprises states comprising different format types, wherein the states are snapshots of an activity of a call center agent, wherein the set of call data is related to multiple customer interactions, and wherein the microprocessor combines and analyzes the set of call data.

17. The contact center of claim 16, wherein the at least one source controlled independently of the management module sources comprises at least one of an IVR and ICR.

18. The contact center of claim 16, wherein a first source is controlled independently of the management module sources and the first source receives a call from a PSTN prior to the management module sources.

19. The contact center of claim 18, wherein a second source is controlled independently of the management module sources, wherein the set of call data comprises data from the management module, the first source, and the second source.

20. The contact center of claim 16, wherein the call data is not in ECH.

* * * * *